(12) United States Patent
Du et al.

(10) Patent No.: US 11,766,741 B2
(45) Date of Patent: Sep. 26, 2023

(54) VARIFOCAL LASER PROCESSING SYSTEM AND METHOD BASED ON VARIABLE LIGHT SPOT DIFFRACTIVE ELEMENT

(71) Applicant: HSG LASER CO., LTD., Guangdong (CN)

(72) Inventors: Bin Du, Guangdong (CN); Yong Chang, Guangdong (CN)

(73) Assignee: HSG LASER CO., LTD., Guangdong (CN)

( * ) Notice: Subject to any disclaimer, the term of this patent is extended or adjusted under 35 U.S.C. 154(b) by 0 days.

(21) Appl. No.: 17/980,524

(22) Filed: Nov. 3, 2022

(65) Prior Publication Data

US 2023/0166351 A1      Jun. 1, 2023

(30) Foreign Application Priority Data

Nov. 30, 2021    (CN) .......................... 202111440767.2

(51) Int. Cl.
    *B23K 26/06*         (2014.01)
(52) U.S. Cl.
    CPC ................................ *B23K 26/0648* (2013.01)
(58) Field of Classification Search
    CPC .............. B23K 26/0643; B23K 26/064; B23K 26/0648; G02B 5/1823; G02B 5/1842; G02B 27/4227
See application file for complete search history.

(56) References Cited

U.S. PATENT DOCUMENTS

| | | | |
|---|---|---|---|
| 10,393,929 B1 * | 8/2019 | Bikumandla | ........ G02B 5/1823 |
| 2010/0134869 A1 * | 6/2010 | Bernet | .................... G02B 26/06 |
| | | | 359/290 |
| 2017/0017054 A1 * | 1/2017 | Roffers | ............. B23K 26/0648 |

FOREIGN PATENT DOCUMENTS

CN                101419336         4/2009

* cited by examiner

*Primary Examiner* — Brian W Jennison
(74) *Attorney, Agent, or Firm* — JCIPRNET

(57) ABSTRACT

The present invention discloses a varifocal laser processing system and method based on a variable light spot diffractive element. The system includes a laser device for generating a laser, a collimating lens for changing a light path and a diffractive optical element module for controlling light spot focal point distribution. The laser emitted by the laser device passes through the collimating lens to irradiate the diffractive optical element module, and the laser focused by the diffractive optical element module irradiates a to-be-processed workpiece; and the diffractive optical element module includes at least two DOE lenses oppositely distributed in an axial direction and a rotary actuator driving the DOE lenses to rotate. The rotary actuator drives at least one DOE lens to rotate with a central axis as a rotating center, thereby changing a position of a focal point generated after the laser is focused by the diffractive optical element module.

8 Claims, 4 Drawing Sheets

Position (unit: mm)

VARIFOCAL LASER PROCESSING SYSTEM AND METHOD BASED ON VARIABLE LIGHT SPOT DIFFRACTIVE ELEMENT

CROSS-REFERENCE TO RELATED APPLICATIONS

This application claims the priority benefit of China application no. 202111440767.2 filed on Nov. 30, 2021. The entirety of each of the above-mentioned patent applications is hereby incorporated by reference herein and made a part of this specification.

TECHNICAL FIELD

The present invention relates to the technical field of laser processing, in particular to a varifocal laser processing system and method based on a variable light spot diffractive element.

BACKGROUND

In the field of laser processing, most of existing methods for adjusting a laser focal point are implemented by axial movement of a lens, so that the focal point dynamically changes, but this adjusting manner requires to set an axial displacement actuator, and influences on the focal point position from axial displacement need to be calculated as well. Meanwhile, the axial length of a whole laser processing device is necessarily increased when the lens is driven to axially move. Consequently, the device is enlarged, and thus the adjusting manner is not suitable for a compact-structure laser processing device.

SUMMARY

To solve the above problems, a first object of the present invention provides a varifocal laser processing system based on a variable light spot diffractive element. Diffractive Optical Element (DOE) lenses can work with space or weight strictly limited through chip phase control. Meanwhile, a focal length of a diffractive optical element module is accurately adjusted through mutual rotation of the two DOE lenses by a certain angle, the focal length and a focal point position of a laser are fixed, and there is no need to apply external force by pressure or voltage. Thus, adjustment on refractive power needed by the system is precise and repeatable, and once adjusted, the refractive power cannot creep. Meanwhile, this system requires no axial displacement actuator thanks to its zooming manner, thereby greatly reducing the structure size of mechanical parts, and making the whole system more compact.

In order to achieve the above purpose of the invention, the present invention adopts the following technical solution:

a varifocal laser processing system based on a variable light spot diffractive element, includes:

a laser device for generating a laser, a collimating lens for changing a light path and a diffractive optical element module for controlling light spot focal point distribution, wherein the collimating lens is arranged between the laser device and the diffractive optical element module, the laser emitted by the laser device passes through the collimating lens to irradiate the diffractive optical element module, the laser focused by the diffractive optical element module irradiates a to-be-processed workpiece, and the diffractive optical element module is configured to control optical power of DOE lenses and focal point distribution of the laser so that a focal point generated by the diffractive optical element module can move along a preset processing track so as to finish processing of the to-be-processed workpiece; and the diffractive optical element module includes at least two DOE lenses oppositely distributed in an axial direction and a rotary actuator driving the DOE lenses to rotate, wherein the DOE lenses, the collimating lens and the laser generated by the laser device are located on the same central axis, and the rotary actuator drives at least one DOE lens to rotate with the central axis as a rotating center, thereby enabling the at least two DOE lenses to mutually rotate so as to change the position of the focal point generated after the laser is focused by the diffractive optical element module.

The DOE lenses are diffractive element lenses. A lens set is formed by every two oppositely-arranged DOE lenses, where the two oppositely-arranged DOE lenses can complete relative rotation. Specifically, one of the DOE lenses is fixed, and the other DOE lens rotates; or the two DOE lenses rotate at the same time so as to complete relative rotation.

Preferably, different characteristic functions are selected according to lens array sizes, image element sizes and varifocal intervals of the DOE lenses to set lens outlines.

Preferably, the rotary actuator includes a rotation drive motor, a driving gear and a driven gear. The drive shaft of the rotation drive motor is connected to the driving gear, the driven gear is engaged with the driving gear, at least one DOE lens is connected to the driven gear, and the rotation drive motor drives the driving gear to rotate, thereby driving the driven gear and at least one DOE lens to rotate.

Preferably, the diffractive optical element module includes a first DOE lens and a second DOE lens, and the first DOE lens is arranged between the collimating lens and the second DOE lens. The first DOE lens is fixed, and the second DOE lens is driven by the rotary actuator to rotate.

Preferably, the driven gear and the second DOE lens are connected. The second DOE lens is installed in an inner circle of the driven gear so that the driven gear can drive the second DOE lens to rotate around its own center, which will change the phase of the second DOE lens. Then, the focal point position further changes after the laser passes through the first DOE lens and the second DOE lens.

Preferably, the drive shaft of the rotation drive motor is connected to at least one driving gear, and the driving gears may be the same or different in tooth number and diameter. The rotation drive motor drives one or more driving gears to rotate so that driven gears engaged with the driving gears can rotate by the same angle or different angles.

Preferably, a transverse actuator is further included and drives at least one DOE lens to move in a radial direction perpendicular to the central axis so that the two DOE lenses can transversely move in a stagger manner, thereby measuring an influence degree of transverse stagger deviation of the two DOE lenses on the focal point position.

Preferably, the transverse actuator includes a rack, a sliding table arranged on the rack, and a transverse drive motor driving the sliding table to transversely move in a direction perpendicular to an optical axis direction of the DOE lenses. The rotary actuator is arranged on the sliding table, and the transverse drive motor drives the sliding table and the DOE lens connected to the rotary actuator to transversely move relative to the fixed DOE lens.

Based on the same invention concept, a second object of the present invention is to provide a varifocal laser processing method based on a variable light spot diffractive element, including the following steps:

S1: selecting a laser device for generating a laser, a collimating lens for changing a light path and a diffractive optical element module for controlling light spot focal point distribution, arranging the collimating lens between the laser device and the diffractive optical element module, and selecting different characteristic functions for setting a lens outline function of DOE lenses according to lens array sizes, image element sizes and varifocal intervals of the DOE lenses;

S2: selecting, by the diffractive optical element module, at least two DOE lenses oppositely distributed in an axial direction and a rotary actuator driving the DOE lenses to rotate, and driving, by the rotary actuator, at least one DOE lens to rotate by an angle θ with an optical axis of the DOE lens as a rotating center, thereby enabling the at least two DOE lenses to mutually rotate so as to change optical power of the DOE lenses, and a position of a focal point generated after the laser is focused by the diffractive optical element module; and S3: starting the laser device, enabling, by the collimating lens, the laser emitted by the laser device to irradiate the diffractive optical element module, enabling the laser focused by the diffractive optical element module to irradiate a to-be-processed workpiece, and controlling, by the diffractive optical element module, the optical power of the DOE lenses and focal point distribution of the laser so that the focal point generated by the diffractive optical element module can move along a preset processing track so as to finish processing of the to-be-processed workpiece.

Preferably, a process of calculating the optical power of the lenses after the two DOE lenses complete relative rotation in step S2 includes the following steps:

a1: selecting a first DOE lens and a second DOE lens which are oppositely arranged, where the first DOE lens is kept fixed, and the second DOE lens is driven by a rotary actuator to rotate with an optical axis of the DOE lens as a rotating center. The rotating angle is θ, phase configurations of the first DOE lens and the second DOE lens are T1 and T2, and computational formulas of T1 and T2 are as below:

$$T_1 = \exp[iF(r)\varphi]$$

$$T_2 = \exp[-iF(r)\varphi]$$

where, r and φ are polar coordinates measured from centers of the DOE lenses, F(r) is a lens outline function of the DOE lenses, the lens outline function only lies on a radial coordinate r, and F(r) is rotational symmetry;

a2: converting the target phase configuration T2 of the second DOE lens into $T_{2t}$ when the second DOE lens rotates by an angle θ, and computational formulas of $T_{2t}$ are shown as below:

$$T_{2t} = \exp[-iF(r)(\varphi-\theta)](0 \le \varphi < 2\pi)$$

$$T_{2t} = \exp[-iF(r)(\varphi-\theta+2\pi)](0 \le \varphi < \theta)$$

where, it can be known from the above formulas that in the whole process of rotating around the rotating center by the angle θ, phases are linearly increased, and meanwhile phase information of a linear phase change formed by a front phase and a rear phase after rotation changes accordingly; and a3: substituting the DOE lens outline function selected according to the lens array size, the image element size and the varifocal interval in step S1 into the formulas in step a2, and calculating optical power f1 and optical power f2 which are different after the second DOE lens rotates by the angle θ.

Preferably, paraboloid Fresnel lenses are selected in step S1 to serve as lens outlines of the DOE lenses, and a lens outline characteristic function is:

$$F(r) = ar^2$$

where, r is a radial polar coordinate, and a is an optional constant; and the formula is substituted into the formulas in step a2 to obtain following formulas:

$$T_{2t} = \exp[(-i\theta ar^2)](0 \le \varphi < 2\pi)$$

$$T_{2t} = \exp[(i(\theta-2\pi)ar^2](0 \le \varphi < \theta)$$

the optical power f1 and the optical power f2 being different and obtained according to phase information of the second DOE lens changing after the second DOE lens rotates by θ are as below:

$$f_1 = \theta a\lambda/\pi (0 \le \varphi < 2\pi)$$

$$f_2 = (\theta-2\pi)a\lambda/\pi (0 \le \varphi < \theta)$$

where, lambda is an operating wavelength, a is phase constant definition, and θ is a changed angle.

It can be seen according to the formulas of the optical power f1 and the optical power f2 that a difference between refractive power of sections of the two lenses is constant, due to 2r periodicity of a phase parameter in the characteristic function of the selected paraboloid Fresnel lenses, a radial phase distribution function is defined as F(r)=round, T1 and T2 define a transfer function of conversion of two phases, a relative angle change may be equivalent to a refractive capability change, thus, a transmission function consists of a series of constant-phase concentric rings becoming thinner outside a lens area, and there is constantly a fixed phase jump between the adjacent rings formed behind the DOE lenses.

Preferably, step S2 further includes a step of dynamic evaluation of transverse stagger deviation of DOE lenses:

arranging a transverse actuator, and driving, by the transverse actuator, at least one DOE lens to move in a radial direction perpendicular to a central axis so that the two DOE lenses can transversely move in a stagger manner, thereby measuring an influence degree of transverse stagger deviation of the two DOE lenses on a focal point position, where the two DOE lenses transversely move in a stagger manner with the precision being 0.1-1 micron.

Preferably, the two DOE lenses transversely move in a stagger manner with the precision being 0.5 micron.

Compared with the prior art, the present invention has the beneficial technical effects:

1. The DOE lenses work with space or weight strictly limited through chip phase control, meanwhile, a focal length of the diffractive optical element module is accurately adjusted through mutual rotation of the two DOE lenses by a certain angle, the focal length and the focal point position of the laser are fixed, and there is no need to apply external force by pressure or voltage. Thus, adjustment on the refractive power needed by the system is precise and repeatable, and once adjusted, the refractive power cannot creep.

2. Lens aberration is further avoided due to flatness of the DOE lenses, and the DOE lenses even further provide possibility for designing aspheric-surface free-form surface lenses and can be used for correcting aberration of standard lenses in a combined lens system. Meanwhile, the DOE lenses are high in dispersivity, have refracting power being in linear relationship with an optical wavelength and are opposite to refractive glass lenses in dispersion, thus, the DOE lenses can be used in the diffractive optical element module of the system, and accordingly the system has a composite refraction/diffraction optical system for reducing aberration, and can achieve about 85% maximum relative efficiency within a broadband wavelength range.

3. An axial displacement actuator does not need to be arranged due to a zooming manner of the system, thereby greatly reducing structure sizes of mechanical parts, and making the whole system more compact.

4. The system combines energy shaping symmetric phase design and adjusts energy and the beam focal point position through rotation of the DOE lenses in a zooming process so as to achieve a dynamic and focus-adjustable rapid response scheme, thereby performing laser processing on the to-be-processed workpiece through dynamic light spots.

5. The system determines a change relationship between the optical power and diffraction efficiency by studying different types of array phase arrangement schemes and performing a practical test on phase elements with diffraction efficiency meeting requirements in combination with practical test efficiency, thereby achieving a dynamic light field element design with stable and controllable light source energy output.

1.1-laser device; 1.2-collimating lens; 1.3-first DOE lens; 1.4-second DOE lens; 1.5-driving gear; 1.6-driven gear; and 1.7-rotation drive motor.

DETAILED DESCRIPTION OF EMBODIMENTS

To make purposes, technical solutions and advantages of the present invention more clearly understood, the present invention is further described in detail by combining embodiments as below, but the scope claimed for protection by the present invention is not limited to the following specific embodiments.

EMBODIMENT 1

Figure 1:
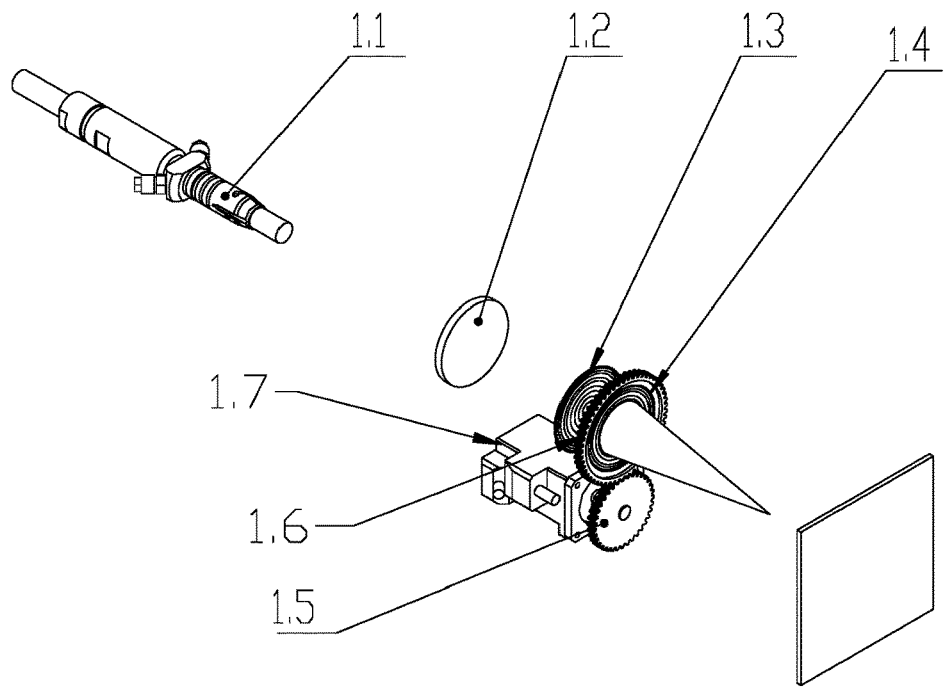
FIG. 1 is a configuration schematic diagram when a second DOE lens in a varifocal laser processing system based on a variable light spot diffractive element rotates by θ degree according to an Embodiment 1 of the present invention.
Figure 2:
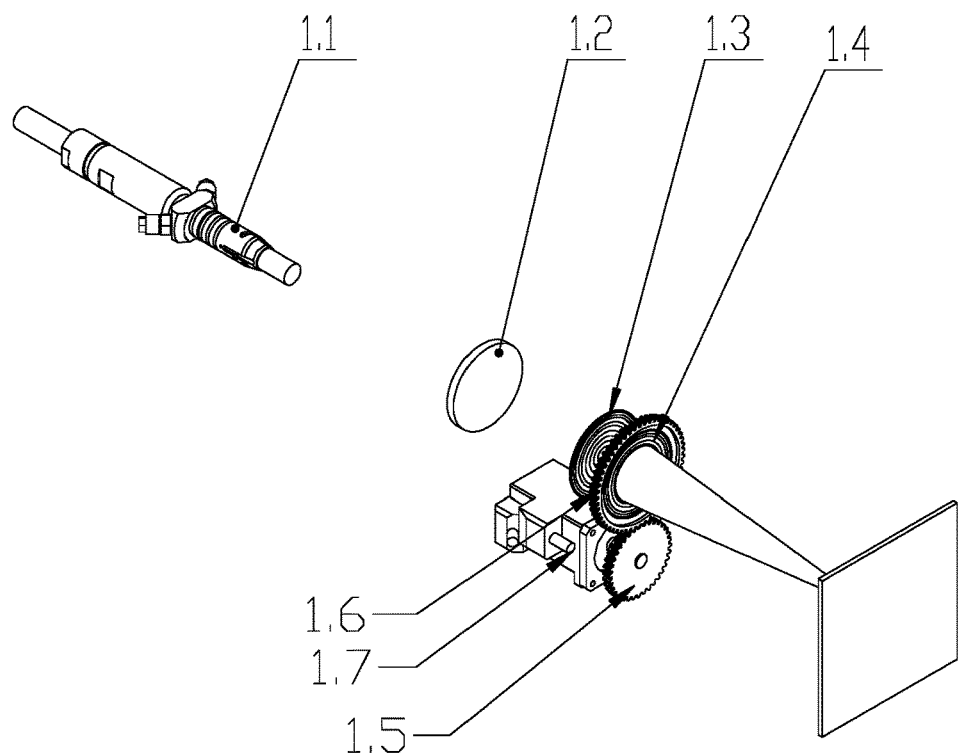
FIG. 2 is a configuration schematic diagram when the second DOE lens in the varifocal laser processing system based on the variable light spot diffractive element rotates by 60 degrees according to the Embodiment 1 of the present invention.

Refer to FIG. 1 and FIG. 2, the embodiment discloses a varifocal laser processing system based on a variable light spot diffractive element, including: a laser device 1.1 for generating a laser, a collimating lens 1.2 for changing a light path and a diffractive optical element module for controlling light spot focal point distribution. The collimating lens 1.2 is arranged between the laser device 1.1 and the diffractive optical element module. The laser emitted by the laser device 1.1 passes through the collimating lens 1.2 to irradiate the diffractive optical element module, the laser focused by the diffractive optical element module irradiates a to-be-processed workpiece, the diffractive optical element module is configured to control optical power of DOE lenses and focal point distribution of the laser so that a focal point generated by the diffractive optical element module can move along a preset processing track so as to finish processing of the to-be-processed workpiece; and the diffractive optical element module includes at least two DOE lenses oppositely distributed in an axial direction and a rotary actuator driving the DOE lenses to rotate. The DOE lenses, the collimating lens 1.2 and the laser generated by the laser device 1.1 are located on the same central axis, the rotary actuator drives at least one DOE lens to rotate with the central axis as a rotating center, thereby enabling the at least two DOE lenses to mutually rotate so as to change a position of a focal point generated after the laser is focused by the diffractive optical element module. A collimating beam obtained after passing through the collimating lens 1.2 irradiates the diffractive optical element module, a camera with laser intensity response is used for evaluating light spots, formed by the DOE lenses, on a rear focal plane, and an evaluation function is a Point Spread Function (PSF).

The DOE lenses are diffractive element lenses and are two-dimensional distributed diffractive units commonly formed by a micro-nano etching process, and each diffractive unit may have a specific shape, a refractive index, etc., and performs fine regulation and control on wavefront phase distribution of the laser. The laser is diffracted after passing through each diffractive unit and generates interference at a certain distance (commonly infinity or a lens focal plane), thereby forming specific light intensity distribution. A lens set is formed by every two oppositely-arranged DOE lenses, where the two oppositely-arranged DOE lenses can complete relative rotation, specifically, one of the DOE lenses is fixed, and the other DOE lens rotates; or the two DOE lenses rotate at the same time so as to complete relative rotation.

Meanwhile, due to low reduction of a contrast ratio caused by a bifocal character of the DOE lenses, light is strongly defocused by unneeded lenses, and thus, foal points are diminished in an image plane. To solve the problem of the bifocal lenses, one of the two DOE lenses being fixed adopts non-integer Mole lens design, and a corresponding absorption mask shields unneeded parts, and thus a single-lens varifocal objective becomes feasible.

Refer to FIG. 1 and FIG. 2, in the embodiment, preferably, the diffractive optical element module includes a first DOE lens 1.3 and a second DOE lens 1.4, the first DOE lens 1.3 is arranged between the collimating lens 1.2 and the second DOE lens 1.4, the first DOE lens 1.3 is fixed, and the second DOE lens 1.4 is driven by the rotary actuator to rotate.

Figure 3:
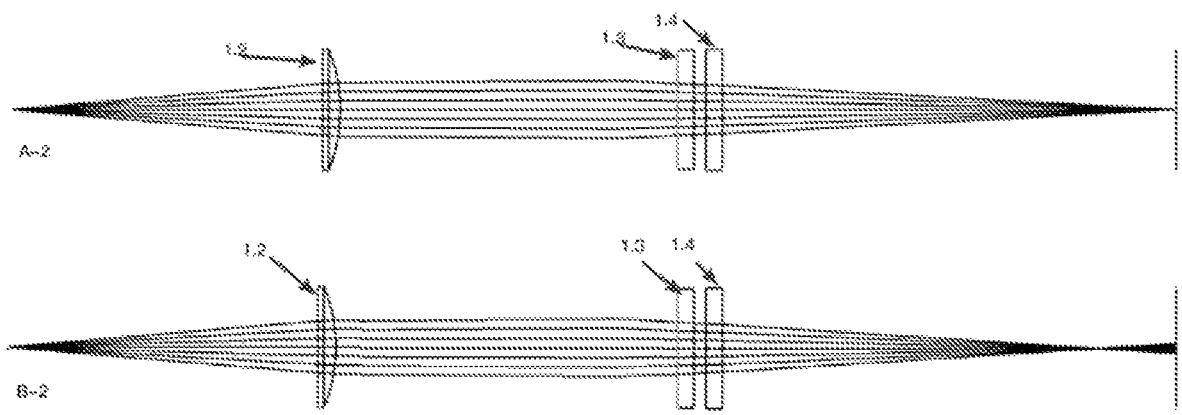
FIG. 3 illustrates a light path schematic diagram and a focal point position schematic diagram when the second DOE lens rotates by θ degree and 60 degrees according to the Embodiment 1 of the present invention.

Refer to FIG. 3, A-2 in FIG. 3 draws a light path schematic diagram and a focal point position when the second DOE lens 1.4 rotates by θ degree. B-2 draws a light path schematic diagram and a focal point position when the second DOE lens 1.4 rotates by 60 degrees, and it can be clearly seen from A-2 and B-2 that the focal point position is changed.

Figure 4:
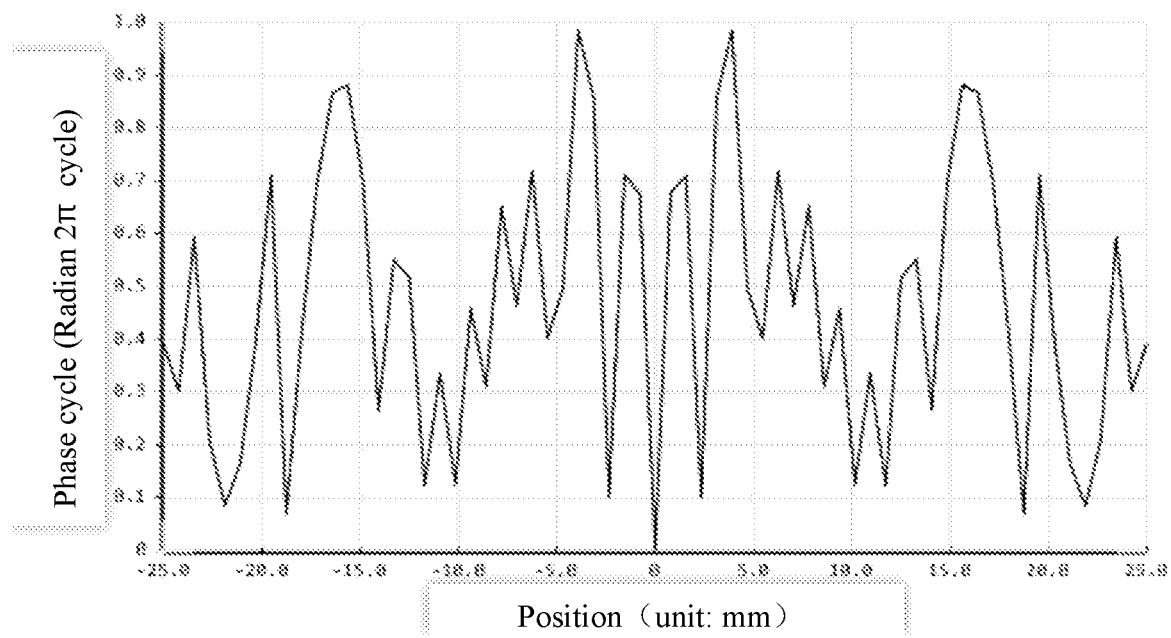
FIG. 4 is a phase configuration schematic diagram when a first DOE lens and the second DOE lens relatively rotate by 60 degrees according to the Embodiment 1.
Figure 5:
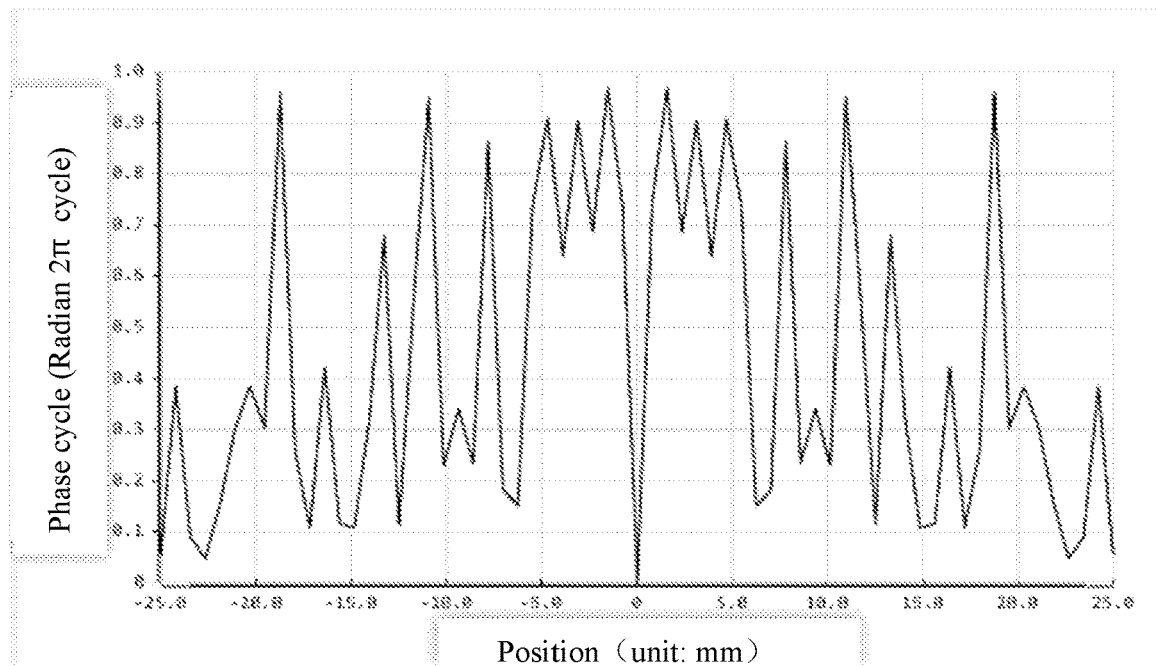
FIG. 5 is a phase configuration schematic diagram when the first DOE lens and the second DOE lens relatively rotate by 300 degrees according to the Embodiment 1.

Meanwhile, refer to a phase configuration schematic diagram drawn in FIG. 4 showing relative rotation θ being 60 degrees of the first DOE lens 1.3 and the second DOE lens 1.4 and a phase configuration schematic diagram drawn in FIG. 5 showing relative rotation θ being 300 degrees of the first DOE lens 1.3 and the second DOE lens 1.4, a varifocal scheme is determined through phase comparison and diffraction efficiency evaluation in a rotating process.

As shown in Table 1, different characteristic functions are selected according to lens array sizes, image element sizes and varifocal intervals of the DOE lenses to set lens outlines of the DOE lenses. The embodiment achieves a dynamic light field element design with stable and controllable light source energy output by studying different types of array phase arrangement schemes, performing a practical test on phase elements with diffraction efficiency meeting requirements in combination with practical test efficiency, and determining a change relationship between optical power and diffraction efficiency.

TABLE 1

Lens outline characteristic functions of DOE lenses under different array sizes, image element sizes and varifocal intervals

| Serial number | Array size | Image element size (micron) | Phase constant definition | Zoom interval | Characteristic function |
|---|---|---|---|---|---|
| 1 | 4500 × 4500 | 2 | a = 3.8*10^7 | −30−+30 | $F_r = ar^2$ |
| 2 | 4500 × 4500 | 2 | a = 3.8*10^7 | −30−+30 | $F_r = \text{round}\{ar^2\}$ |
| 3 | 4500 × 4500 | 2 | a = 3.8*10^7<br>b = 2.25*10^7 | −20−+40 | $T_{Fr(r)} = \exp[i\varphi\text{round}(ar^2) + ibr^2]$ |
| 4 | 6200 × 6200 | 1 | a = 8.5*10^7 | −110−+110 | $F_r = \text{round}\{ar^2\}$ |

*Define round as an integer function

Figure 6:
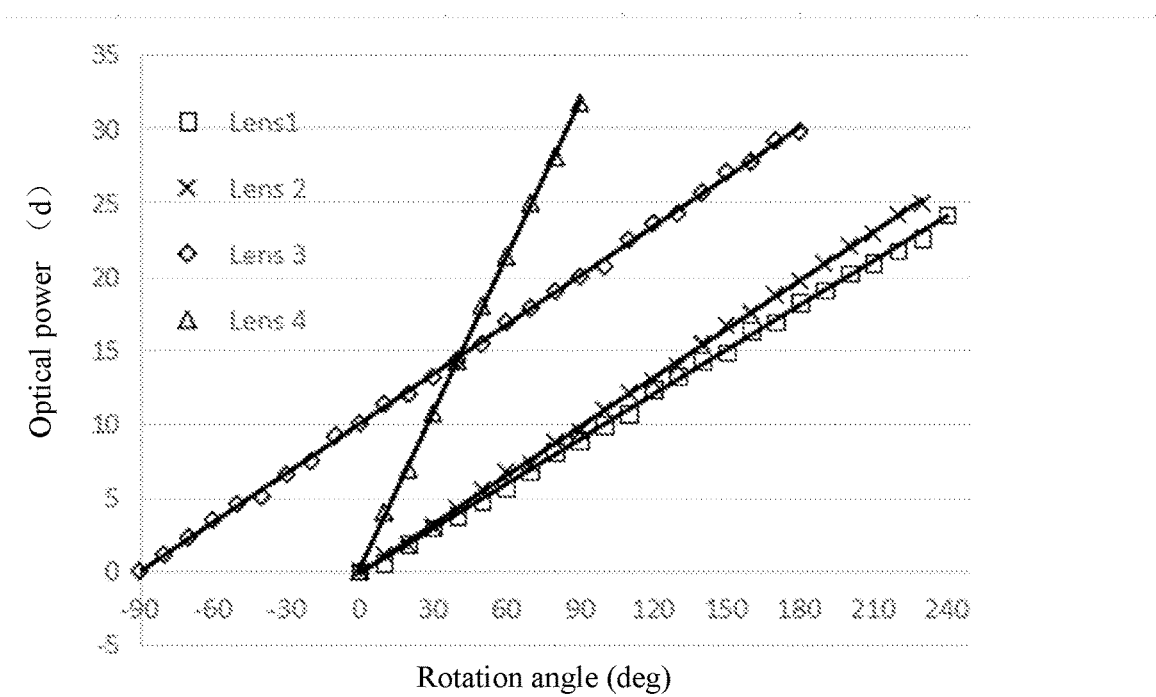
FIG. 6 is a rotation angle and optical power change relationship schematic diagram of four different specifications of DOE lenses in Table 1 according to the Embodiment 1 of the present invention.
Figure 7:
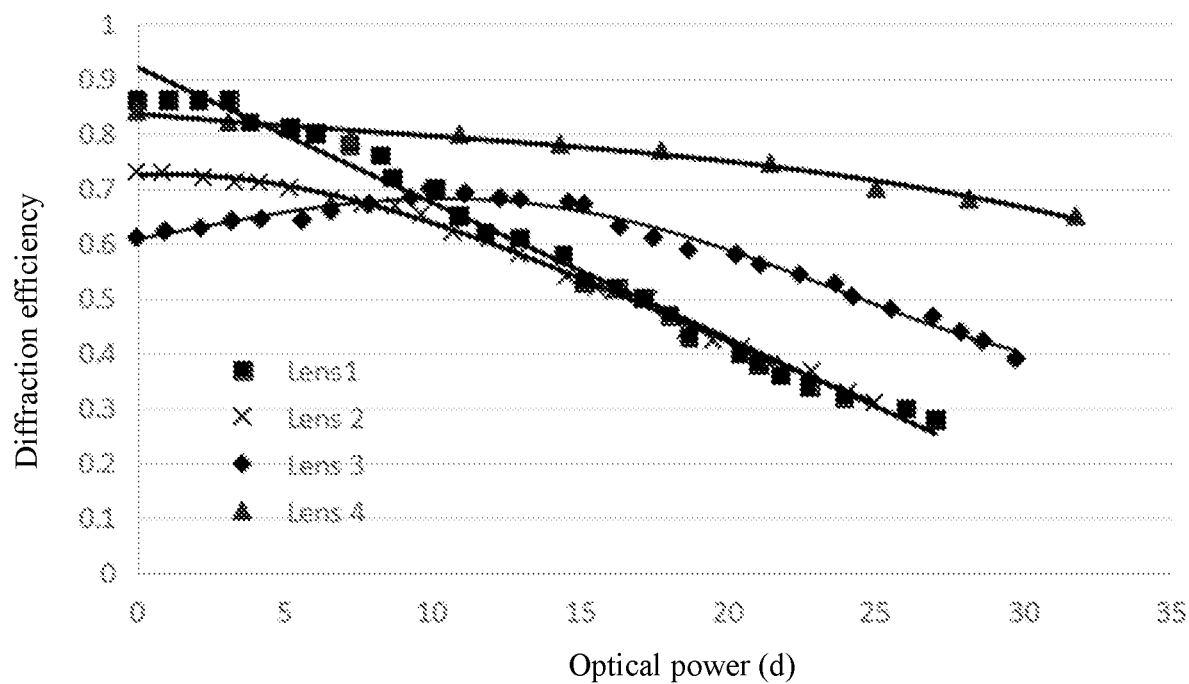
FIG. 7 is an optical power and diffraction efficiency change relationship schematic diagram of four different specifications of DOE lenses in Table 1 according to the Embodiment 1 of the present invention, where, technical features indicated by drawing labels are as below.

A specific implementation scheme is determined by comparing the DOE lenses with different array sizes. Refer to FIG. 6 and FIG. 7 being a lens optical power variation diagram of four specifications of DOE lenses rotating by different angles and a schematic diagram of a optical power and diffraction efficiency change relationship of DOE lenses different in specification, different lens outline characteristic functions may be selected according to practical processing requirements for selecting specific DOE lenses so as to meet different processing requirements.

The rotary actuator includes a rotation drive motor 1.7, a driving gear 1.5 and a driven gear 1.6, a drive shaft of the rotation drive motor 1.7 is connected to the driving gear 1.5, the driven gear 1.6 is engaged with the driving gear 1.5, at least one DOE lens is connected to the driven gear 1.6, and the rotation drive motor 1.7 drives the driving gear 1.5 to rotate, thereby driving the driven gear 1.6 and at least one DOE lens to rotate. In the embodiment, the driven gear 1.6 and the second DOE lens 1.4 are connected, the second DOE lens 1.4 is installed in an inner circle of the driven gear 1.6 so that the driven gear 1.6 can drive the second DOE lens 1.4 to rotate with a center of the second DOE lens 1.4 as a rotating center, a phase of the second DOE lens 1.4 changes, and a focal point position further changes after the laser passes through the first DOE lens 1.3 and the second DOE lens 1.4.

The embodiment further includes a transverse actuator driving at least one DOE lens to move in a radial direction perpendicular to the central axis so that the two DOE lenses can transversely move in a stagger manner, thereby measuring an influence degree of transverse stagger deviation of the two DOE lenses on the focal point position.

The transverse actuator includes a rack, a sliding table arranged on the rack, and a transverse drive motor driving the sliding table to transversely move in a direction perpendicular to an optical axis direction of the DOE lenses, the rotary actuator is arranged on the sliding table, and the transverse drive motor drives the sliding table and the DOE lens connected to the rotary actuator to transversely move relative to the fixed DOE lens. Transverse stagger deviation is dynamically evaluated through synchronous evaluation on stagger influences of the first DOE lens 1.3 and the second DOE lens 1.4 being symmetrically sensitive, and due to transverse stagger influences of DOE elements, the two DOE lenses transversely move in a stagger manner with precision being 0.1-1 micron. Preferably, the first DOE lens 1.3 is kept fixed, the second DOE lens 1.4 transversely moves in the radial direction, and the two DOE lenses transversely move in a stagger manner with the precision being 0.5 micron.

EMBODIMENT 2

The embodiment only describes contents different from the above embodiment. In the embodiment, a drive shaft of a rotation drive motor 1.7 is connected to two or more driving gears 1.5, the driving gears 1.5 may be the same or different in tooth number and diameter, the rotation drive motor 1.7 drives one or more driving gears 1.5 to rotate so that driven gears 1.6 engaged with the driving gears 1.5 can rotate by the same angle or different angles. The embodiment can construct a diffractive optical element module composed of three or more DOE lenses.

EMBODIMENT 3

The disclosure of the embodiment is based on the same invention concept, and a second object of the present invention is to provide a varifocal laser processing method based on a variable light spot diffractive element, including the following steps:

S1: Select a laser device for generating a laser, a collimating lens for changing a light path and a diffractive optical element module for controlling light spot focal point distribution, arrange the collimating lens between the laser device and the diffractive optical element module, and select different characteristic functions according to lens array sizes, image element sizes and varifocal intervals of the DOE lenses to set a lens outline function of DOE lenses.

S2: Select, by the diffractive optical element module, at least two DOE lenses oppositely distributed in an axial direction and a rotary actuator driving the DOE lenses to rotate, and drive, by the rotary actuator, at least one DOE lens to rotate by an angle θ with an optical axis of the DOE lens as a rotating center, thereby enabling the at least two DOE lenses to mutually rotate so as to change optical power of the DOE lenses, and a position of a focal point generated after the laser is focused by the diffractive optical element module.

S3: Start the laser device, enable, by the collimating lens, the laser emitted by the laser device to irradiate the diffractive optical element module, enable the laser focused by the diffractive optical element module to irradiate a to-beprocessed workpiece, and control, by the diffractive optical element module, the optical power of the DOE lenses and focal point distribution of the laser so that the focal point generated by the diffractive optical element module can move along a preset processing track so as to finish processing of the to-be-processed workpiece.

A collimating beam irradiates the DOE lenses, and a camera with laser intensity response is used for evaluating the lenses on a rear focal plane by a PSF. People further indicate that due to low reduction of a contrast ratio caused by a bifocal character of the DOE lenses, light is strongly defocused by unneeded lenses, and thus, light is diminished in an image plane. The other option for solving the problem of the bifocal lenses is to use non-integer Mole lens design of an element 1, and a corresponding absorption mask shields unneeded parts. A single-lens varifocal objective becomes feasible. In addition, a combination of two or more DOEs allows to construct a novel optical system without axial displacement of any module.

A process of calculating the optical power of the lenses after the two DOE lenses finish relative rotation in step S2 includes the following steps:

a1: Select a first DOE lens and a second DOE lens which are oppositely arranged, where the first DOE lens is kept fixed, the second DOE lens is driven by a rotary actuator to rotate with an optical axis of the DOE lens as a rotating center, a rotating angle is θ, phase configurations of the first DOE lens and the second DOE lens are T1 and T2, and computational formulas of T1 and T2 are as below:

$$T_1 = \exp[iF(r)\varphi]$$

$$T_2 = \exp[-iF(r)\varphi]$$

Where, r and φ are polar coordinates measured from centers of the DOE lenses, F(r) is a lens outline function of the DOE lenses, the lens outline function only lies on a radial coordinate r, and F(r) is rotational symmetry.

a2: Convert the target phase configuration T2 of the second DOE lens into $T_{2t}$ when the second DOE lens rotates by an angle θ, and computational formulas of $T_{2t}$ are shown as below:

$$T_{2t} = \exp[-iF(r)(\varphi-\theta)](0 \leq \varphi < 2\pi)$$

$$T_{2t} = \exp[-iF(r)(\varphi-\theta+2\pi)](0 \leq \varphi < \theta)$$

It can be known from the above formulas that in the whole process of rotating around the rotating center by θ, phases are linearly increased, and meanwhile phase information of a linear phase change formed by a front phase and a rear phase after rotation changes accordingly.

a3: Substitute the DOE lens outline function selected according to the lens array size, the image element size and the varifocal interval in step S1 into the formulas in step a2, and calculate optical power f1 and optical power f2 which are different after the second DOE lens rotates by the angle θ.

Preferably, paraboloid Fresnel lenses are selected in step S1 to serve as lens outlines of the DOE lenses, and a lens outline characteristic function is:

$$F(r) = ar^2$$

Where, r is a radial polar coordinate, and a is an optional constant; and the formula is substituted into the formulas in step a2 to obtain following formulas:

$$T_{2t} = \exp[(-i\theta ar^2)](0 \leq \varphi < 2\pi)$$

$$T_{2t} = \exp[(i(\theta-2\pi)ar^2](0 \leq \varphi < \theta)$$

the optical power f1 and the optical power f2 being different and obtained according to phase information of the second DOE lens changing after the second DOE lens rotates by θ are as below:

$$f_1 = \theta a \lambda / \pi (0 \leq \varphi < 2\pi)$$

$$f_2 = (\theta - 2\pi) a \lambda / \pi (0 \leq \varphi < \theta)$$

Where, lambda is an operating wavelength, a is phase constant definition, and θ is a changed angle.

It can be seen according to the formulas of the optical power f1 and the optical power f2 that a difference between refractive power of sections of the two lenses is constant, due to 2r periodicity of a phase parameter in the characteristic function of the selected paraboloid Fresnel lenses, a radial phase distribution function is defined as F(r)=round, T1 and T2 define a transfer function of conversion of two phases, a relative angle change may be equivalent to a refractive capability change, thus, a transmission function consists of a series of constant-phase concentric rings becoming thinner outside a lens area, and there is constantly a fixed phase jump between the adjacent rings formed behind the DOE lenses.

Preferably, step S2 further includes a step of dynamic evaluation of transverse stagger deviation of DOE lenses:

Arrange a transverse actuator driving at least one DOE lens to move in a radial direction perpendicular to a central axis so that the two DOE lenses can transversely move in a stagger manner, thereby measuring an influence degree of transverse stagger deviation of the two DOE lenses on a focal point position, where the two DOE lenses transversely move in a stagger manner with the precision being 0.1-1 micron.

Preferably, the two DOE lenses transversely move in a stagger manner with the precision being 0.5 micron.

People skilled in the art of the present invention can further change and modify above execution modes according to revelation and instruction of the above description. Thus, the present invention is not limited to the above disclosed and described specific execution modes, and some modifications and changes made on the present invention should fall within the scope of protection of the claims of the present invention. In addition, although some specific terms are used in the description, the terms merely facilitate explanation and do not limit the present invention.

What is claimed is:

1. A varifocal laser processing system based on a variable light spot diffractive element, comprising:

a laser device for generating a laser, a collimating lens for changing a light path and a diffractive optical element module for controlling light spot focal point distribution, wherein the collimating lens is arranged between the laser device and the diffractive optical element module, the laser emitted by the laser device passes through the collimating lens to irradiate the diffractive optical element module, the laser focused by the diffractive optical element module irradiates a to-be-processed workpiece, the diffractive optical element module is configured to control optical power of DOE lenses and focal point distribution of the laser so that a focal point generated by the diffractive optical element module can move along a preset processing track so as to finish processing of the to-be-processed workpiece; wherein the diffractive optical element module comprises at least two DOE lenses oppositely distributed in an axial direction and a rotary actuator driving the DOE lenses to rotate, the DOE lenses, the collimating lens and the laser generated by the laser device are located on the same central axis, and the rotary actuator drives at least one DOE lens to rotate with the central axis as a rotating center, thereby enabling the at least two DOE lenses to mutually rotate so as to change the position of the focal point generated after the laser is focused by the diffractive optical element module;

wherein different characteristic functions are selected according to lens array sizes, image element sizes and varifocal intervals of the DOE lenses to set lens outlines;

and wherein a transverse actuator is further included, and drives at least one DOE lens to move in a radial direction perpendicular to the central axis so that the two DOE lenses can transversely move in a stagger manner, thereby measuring an influence degree of transverse stagger deviation of the two DOE lenses on the focal point position.

2. The varifocal laser processing system based on the variable light spot diffractive element according to claim 1, wherein the rotary actuator comprises a rotation drive motor, a driving gear and a driven gear, a drive shaft of the rotation drive motor is connected to the driving gear, the driven gear is engaged with the driving gear, at least one DOE lens is connected to the driven gear, and the rotation drive motor drives the driving gear to rotate, thereby driving the driven gear and at least one DOE lens to rotate.

3. The varifocal laser processing system based on the variable light spot diffractive element according to claim 1, wherein the diffractive optical element module comprises a first DOE lens and a second DOE lens, the first DOE lens is arranged between the collimating lens and the second DOE lens, the first DOE lens is fixed, and the second DOE lens is driven by the rotary actuator to rotate.

4. The varifocal laser processing system based on the variable light spot diffractive element according to claim 2, wherein the diffractive optical element module comprises a first DOE lens and a second DOE lens, the first DOE lens is arranged between a collimating lens and the second DOE lens, the first DOE lens is fixed, and the second DOE lens is driven by the rotary actuator to rotate.

5. The varifocal laser processing system based on the variable light spot diffractive element according to claim 1, wherein the transverse actuator comprises a rack, a sliding table arranged on the rack, and a transverse drive motor driving the sliding table to transversely move in a direction perpendicular to an optical axis direction of the DOE lenses, the rotary actuator is arranged on the sliding table, and the transverse drive motor drives the sliding table and the DOE lens connected to the rotary actuator to transversely move relative to the fixed DOE lens.

6. A varifocal laser processing method based on a variable light spot diffractive element, comprising the following steps:

S1: selecting a laser device for generating a laser, a collimating lens for changing a light path and a diffractive optical element module for controlling light spot focal point distribution, arranging the collimating lens between the laser device and the diffractive optical element module, and selecting different characteristic functions according to lens array sizes, image element sizes and varifocal intervals of the DOE lenses to set a lens outline function of DOE lenses;

S2: selecting, by the diffractive optical element module, at least two DOE lenses oppositely distributed in an axial direction and a rotary actuator driving the DOE lenses to rotate, and driving, by the rotary actuator, at least one DOE lens to rotate by an angle $\theta$ with an optical axis of the DOE lens as a rotating center, thereby enabling the at least two DOE lenses to mutually rotate so as to change optical power of the DOE lenses, and a position of a focal point generated after the laser is focused by the diffractive optical element module; and S3: starting the laser device, enabling, by the collimating lens, the laser emitted by the laser device to irradiate the diffractive optical element module, enabling the laser focused by the diffractive optical element module to irradiate a to-be-processed workpiece, and controlling, by the diffractive optical element module, the optical power of the DOE lenses and focal point distribution of the laser so that a focal point generated by the diffractive optical element module can move along a preset processing track so as to finish processing of the to-be-processed workpiece, wherein, step S2 further comprises a step of dynamic evaluation of transverse stagger deviation of the DOE lenses:

arranging a transverse actuator, and driving, by the transverse actuator, at least one DOE lens to move in a radial direction perpendicular to the central axis so that the two DOE lenses can transversely move in a stagger manner, thereby measuring an influence degree of transverse stagger deviation of the two DOE lenses on the focal point position, wherein the two DOE lenses transversely move in a stagger manner with the precision being 0.1-1 micron.

7. The varifocal laser processing method based on the variable light spot diffractive element according to claim 6, wherein a process of calculating the optical power of the lenses after the two DOE lenses finish relative rotation in step S2 comprises the following steps:

a1: selecting a first DOE lens and a second DOE lens which are oppositely arranged, wherein the first DOE lens is kept fixed, the second DOE lens is driven by the rotary actuator to rotate with an optical axis of the DOE lens as a rotating center, a rotating angle is $\theta$, phase configurations of the first DOE lens and the second DOE lens are T1 and T2, and computational formulas of T1 and T2 are as below:

$$T_1 = \exp[iF(r)\varphi]$$

$$T_2 = \exp[-iF(r)\varphi]$$

wherein, r and $\varphi$ are polar coordinates measured from centers of the DOE lenses, F(r) is a lens outline function of the DOE lenses, the lens outline function only lies on a radial coordinate r, and F(r) is rotational symmetry;

a2: converting the target phase configuration T2 of the second DOE lens into $T_{2t}$ when the second DOE lens rotates by an angle $\theta$, and computational formulas of $T_{2t}$ are shown as below:

$$T_{2t} = \exp[-iF(r)(\varphi-\theta)](0 \leq \varphi < 2\pi)$$

$$T_{2t} = \exp[-iF(r)(\varphi-\theta+2\pi)](0 \leq \varphi < \theta)$$

wherein it can be known from the above formulas that in the whole process of rotating around the rotating center by the angle $\theta$, phases are linearly increased, and meanwhile phase information of a linear phase change formed by a front phase and a rear phase after rotation changes accordingly; and a3: substituting the DOE lens outline function selected according to the lens array size, the image element size and the varifocal interval in step S1 into the formulas in step a2, and calculating optical power f1 and optical power f2 which are different after the second DOE lens rotates by the angle θ.

8. The varifocal laser processing method based on the variable light spot diffractive element according to claim 7, wherein paraboloid Fresnel lenses are selected in step S1 to serve as lens outlines of the DOE lenses, and a lens outline characteristic function is:

$$F(r)=ar^2$$

wherein, r is a radial polar coordinate, and a is an optional constant; and the formula is substituted into the formulas in step a2 to obtain following formulas:

$$T_{2t}=\exp[(-i\theta ar^2)](0\leq\varphi<2\pi)$$

$$T_{2t}=\exp[(i(\theta-2\pi)ar^2)](0\leq\varphi<\theta)$$

the optical power f1 and the optical power f2 being different and obtained according to phase information of the second DOE lens changing after the second DOE lens rotates by θ are as below:

$$f_1=\theta a\lambda/\pi(0\leq\varphi<2\pi)$$

$$f_2=(\theta-2\pi)a\lambda/\pi(0\leq\varphi<\theta)$$

wherein, lambda is an operating wavelength, a is phase constant definition, and θ is a changed angle.

* * * * *